Nov. 24, 1964
D. L. RAY ET AL
3,158,496
METHOD FOR PREVENTING THE DESTRUCTION
OF WOOD BY WOOD-BORING ANIMALS
Filed April 5, 1961
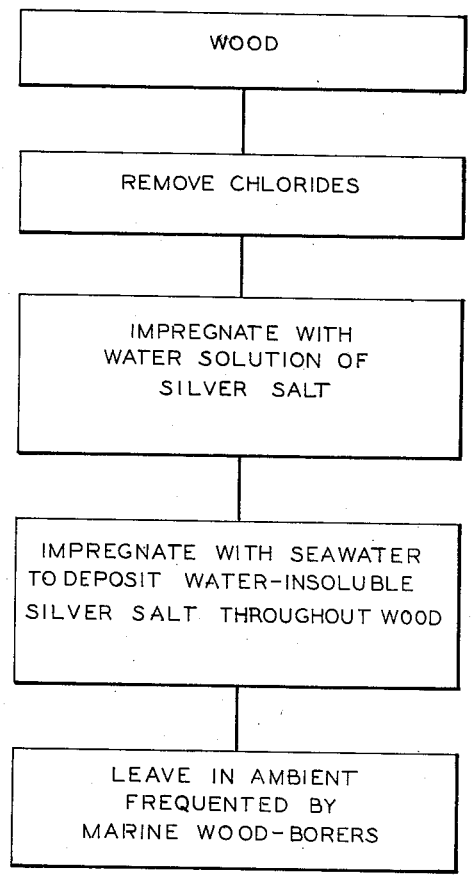
INVENTORS
DIXY L. RAY
CORNELIS B. van NIEL
BY
Paul M. Klein Jr.
ATTORNEY

United States Patent Office 3,158,496
Patented Nov. 24, 1964

3,158,496
METHOD FOR PREVENTING THE DESTRUCTION OF WOOD BY WOOD-BORING ANIMALS
Dixy L. Ray, Bethesda, Md., and Cornelis B. Van Niel, Carmel, Calif., assignors, by mesne assignments, to the United States of America as represented by the Secretary of the Navy
Filed Apr. 5, 1961, Ser. No. 101,027
3 Claims. (Cl. 117—59)

This invention relates to a method for preventing destruction of wood by marine wood-boring animals and more particularly to a method for protecting marine structures such as piles, floats, wooden boats and ships, drydocks and the like, from attack by marine borers such as species of the Teredinidae (shipworms) and Limnoria.

Prior art methods for protecting wood against marine wood-boring animals typically involve impregnation of the wood with creosote or with a creosote-coal tar mixture. These methods of treatment suffer from certain disadvantages. There are many "premature failures" of creosoted piles. Certain species of Limnoria burrow into creosoted piles as rapidly as into untreated wood. The creosote can be driven only a short distance into the wood and hence surface abrasion or bolt holes or the like nullify the protective action of the creosote by exposing the untreated inner wood. Very high impregnation temperatures and pressures are required. The method is practical only for such marine structures as piles and cannot be, or at least is not widely used, for floats, drydocks or wooden hulls.

An object of the present invention is to provide a method for treating wood which will give long-term protection against the attacks of marine wood-boring animals and which will protect the wood substantially throughout.

Other objects and many of the attendant advantages of this invention will readily be appreciated as the same becomes better understood by reference to the following detailed description.

The method of the invention achieves as its final product thorough impregnation of the wood throughout with silver chloride. The method, as set forth in the flow sheet in the drawing, is carried out by first removing any natural chlorides from the wood. Any suitable method can be used for this step, but a convenient method is to autoclave the wood in distilled water until the surrounding water no longer gives a chloride reaction upon addition of silver nitrate. The next step involves thorough impregnation of the wood with a solution of a silver compound. This can be achieved by autoclaving the wood in a strong solution of silver nitrate until the wood is thoroughly saturated. The wood then impregnated with silver nitrate is thereafter exposed in contact with a solution containing dissolved chloride. Typically and most conveniently this can be accomplished by placing the silver nitrate-impregnated wood in sea water. The exposure to sea water would be a normal incident to the placement of pilings and the like and thus would not require a separate step of treatment. Exposure to the solution of chlorides, as sea water, causes the sea water to penetrate into the wood, its chlorides reacting with the silver nitrate. The result is the precipitation of insoluble silver chloride throughout the wood substance and even within the wood fiber. Silver chloride is a most insoluble salt and this fact together with the condition of fine dispersion achieved by the process of this invention greatly retards the loss of silver chloride through leaching and insures its retention in the wood for a long period of time. By maintaining the treated wood continuously in sea water, as is done with pilings, hulls, and the like, the silver chloride is retained in the wood to give lasting protection, since the sea water does not leach out the silver chloride from the wood by virtue of the fact that silver chloride is essentially insoluble in the chloride-containing sea water.

The presence of the silver salt in the wood has been found to be an effective protection against marine wood borers. Both laboratory and field tests have established that no marine wood-boring animals enter silver chloride-impregnated wood over a period of a number of years.

The use of silver has been proposed in the remote fields of germicides, insecticides, bactericides, and fungicides. This teaching is, however, of no benefit in attacking the problem of marine borers since the only similarity is the killing of living things and the actual mechanisms of poisoning are utterly different in the various forms of life. Typically it has been proposed to impregnate materials such as gauze bandages and the like with metallic silver deposited from colloidal suspension and with complex ions containing silver. Neither of these methods has satisfactorily been proven to be translatable into the preservation of wood against destruction from the type of life exemplified by marine borers. The deposition of metallic silver would not be continuous throughout the wood matrix and furthermore would not provide the desired amount of soluble material for protection against marine borers, since only the surface of each aggregation of metallic silver crystals would be oxidized or chlorinated. Furthermore, such deposition typically occurs on the surface of cotton or similar fabric fibers, whereas the present invention provides for the formation of silver chloride through the body of wood and thus actually within its fibers. The use of complex silver ions, on the other hand, would provide too much solubility and the silver would leach out and fail to give prolonged protection.

The process of the present invention is notable for its simplicity, for the relative ease with which silver nitrate can be driven deeply into the wood thereby thoroughly impregnating it; for the fact that the environment itself, sea water, can be turned to advantage by relying upon its natural chlorides to precipitate the silver chloride with the wood. Furthermore the extreme insolubility of silver chloride in sea water where an excess of chloride will always be present insures long-term protection. The very finely dispersed nature of the precipitated silver salt provides an essentially continuous silver salt system throughout the wood giving protection throughout the wood as distinguished from what would be discontinuous aggregations of metallic silver crystals in the case of deposition from colloidal silver suspensions. Another advantage is the toxicity of the silver salt to marine wood boring animals as contrasted to the lack of toxicity of this salt to the free-swimming fishes and other aquatic animals, even those in close proximity to treated wood, and the lack of toxicity or of any noxious side effects for humans who handle the impregnation process and the treated wood.

It is apparent that other materials than silver nitrate can be used so long as they are soluble to provide the source of silver ion for forming the insoluble silver chloride. However, silver nitrate is a very soluble and readily available source and hence is convenient to use.

Obviously many modifications and variations of the present invention are possible in the light of the above teachings. It is therefore to be understood that within the scope of the appealed claims the invention may be practiced otherwise than as specifically described.

What is claimed is:

1. The method of protecting wood from destruction by marine wood-boring animals which comprises removing existing chlorides from the wood by autoclaving the wood with distilled water until the surrounding water no longer gives a chloride reaction with silver nitrate; thereafter autoclaving the wood in a strong solution of silver nitrate until the wood is thoroughly saturated therewith; and thereafter exposing said wood to contact with sea water whereby there is achieved an essentially continuous distribution of insoluble silver chloride throughout the wood matrix.

2. The method of protecting wood from destruction by marine wood-boring animals which comprises extracting existing soluble chlorides from the wood; thereafter thoroughly impregnating the wood with a solution of a soluble silver compound; and thereafter placing the wood in contact with sea water and maintaining it in contact with the sea water whereby there is deposited and maintained throughout the wood matrix an essentially continuous system of insoluble silver chloride.

3. The method of protecting wood, in the form of pilings and the like intended for use in sea water, from destruction by marine wood-boring animals which comprises extracting existing soluble chlorides from the wood; thereafter thoroughly impregnating the wood with a solution of a soluble silver compound capable of conversion to silver chloride upon contact with chloride; and thereafter emplacing said wood in its intended ambient of sea water and leaving it in contact with the sea water whereby there is deposited and maintained through the wood matrix an essentially continuous system of insoluble silver chloride.

References Cited by the Examiner
UNITED STATES PATENTS

| | | | |
|---|---|---|---|
| 266,092 | 10/82 | Burstenbinder | 117—59 |
| 2,813,056 | 1/57 | Davis | 167—14 |
| 2,919,971 | 1/60 | Loetel | 21—7 |
| 3,077,420 | 2/63 | Kenaga | 117—148 |
| 3,080,257 | 3/63 | Berry | 117—148 |

FOREIGN PATENTS 1,050,534   2/59   Germany.

RICHARD D. NEVIUS, Primary Examiner.

MURRAY KATZ, JOSEPH REBOLD, Examiners.